(12) United States Patent
Fowler

(10) Patent No.: US 11,411,416 B2
(45) Date of Patent: Aug. 9, 2022

(54) WIRELESS VEHICLE CHARGER ASSEMBLY FOR INTEGRATION INTO A DASHBOARD

(71) Applicant: Aamon Fowler, Clearfield, UT (US)

(72) Inventor: Aamon Fowler, Clearfield, UT (US)

( * ) Notice: Subject to any disclaimer, the term of this patent is extended or adjusted under 35 U.S.C. 154(b) by 69 days.

(21) Appl. No.: 17/030,849

(22) Filed: Sep. 24, 2020

(65) Prior Publication Data

US 2022/0094182 A1    Mar. 24, 2022

(51) Int. Cl.
| | | |
|---|---|---|
| *H01M 10/46* | (2006.01) | |
| *H02J 7/00* | (2006.01) | |
| *H02J 50/10* | (2016.01) | |
| *B60R 11/02* | (2006.01) | |
| *B60R 11/00* | (2006.01) | |

(52) U.S. Cl.
CPC ........ *H02J 7/0044* (2013.01); *B60R 11/0241* (2013.01); *H02J 7/00034* (2020.01); *H02J 50/10* (2016.02); *B60R 2011/0005* (2013.01)

(58) Field of Classification Search
CPC .... H02J 7/0044; H02J 7/0042; H02J 7/00034; H02J 50/10; H02J 50/005; B60R 2011/0005; B60R 11/0241
USPC ................................ 320/107, 108, 114, 115
See application file for complete search history.

(56) References Cited

U.S. PATENT DOCUMENTS

| | | | |
|---|---|---|---|
| 9,722,456 B2 | 8/2017 | Lambert | |
| 9,738,227 B2 | 8/2017 | Huebner | |
| 9,744,858 B2 * | 8/2017 | Hall | H02J 50/80 |
| 10,155,482 B2 | 12/2018 | Corso | |
| 10,212,264 B2 | 2/2019 | Robillard | |
| 10,377,316 B2 | 8/2019 | Cha | |
| 10,377,319 B2 | 8/2019 | Muiter | |
| 2013/0154555 A1 | 6/2013 | Miller | |
| 2018/0013871 A1 * | 1/2018 | Robillard | H04M 1/04 |
| 2018/0154866 A1 * | 6/2018 | Sute | G07C 9/00174 |
| 2018/0212453 A1 | 7/2018 | Kwon | |
| 2019/0036369 A1 | 1/2019 | Grant | |
| 2021/0138965 A1 * | 5/2021 | Ugrin | H02J 7/0027 |

FOREIGN PATENT DOCUMENTS

| | | | | |
|---|---|---|---|---|
| KR | 2018119859 A | * | 11/2018 | H02J 50/00 |
| WO | WO2017018669 | | 2/2017 | |

* cited by examiner

*Primary Examiner* — Edward Tso

(57) ABSTRACT

A wireless vehicle charger assembly for wirelessly charging an electronic device in a vehicle includes a box that is integrated into a dashboard of a vehicle. In this way the box is accessible to a driver of the vehicle. A charging unit is integrated into the box and the charging unit is in wireless communication with the electronic device when the electronic device is positioned in the box. The charging unit broadcasts a charging signal to wirelessly charge the electronic device.

8 Claims, 5 Drawing Sheets

WIRELESS VEHICLE CHARGER ASSEMBLY FOR INTEGRATION INTO A DASHBOARD

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to charger devices and more particularly pertains to a new charger device for wirelessly charging an electronic device in a vehicle.

(2) Description of Related Art Including Information Disclosed Under 37 CFR 1.97 and 1.98

The prior art relates to charger devices including a console for a vehicle that has wireless charging capabilities for charging an electronic device. The prior art discloses a variety of storage consoles that are positionable between seats of a vehicle for storing objects in a variety of novel orientations. The prior art discloses a variety of holding devices for holding an electronic device in a preferred orientation within a vehicle. The prior art discloses a tray that is slidably integrated into a dashboard of a vehicle and that includes wireless charging capabilities. Additionally, the prior art discloses a variety of wireless charging devices.

BRIEF SUMMARY OF THE INVENTION

An embodiment of the disclosure meets the needs presented above by generally comprising a box that is integrated into a dashboard of a vehicle. In this way the box is accessible to a driver of the vehicle. A charging unit is integrated into the box and the charging unit is in wireless communication with the electronic device when the electronic device is positioned in the box. The charging unit broadcasts a charging signal to wirelessly charge the electronic device.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
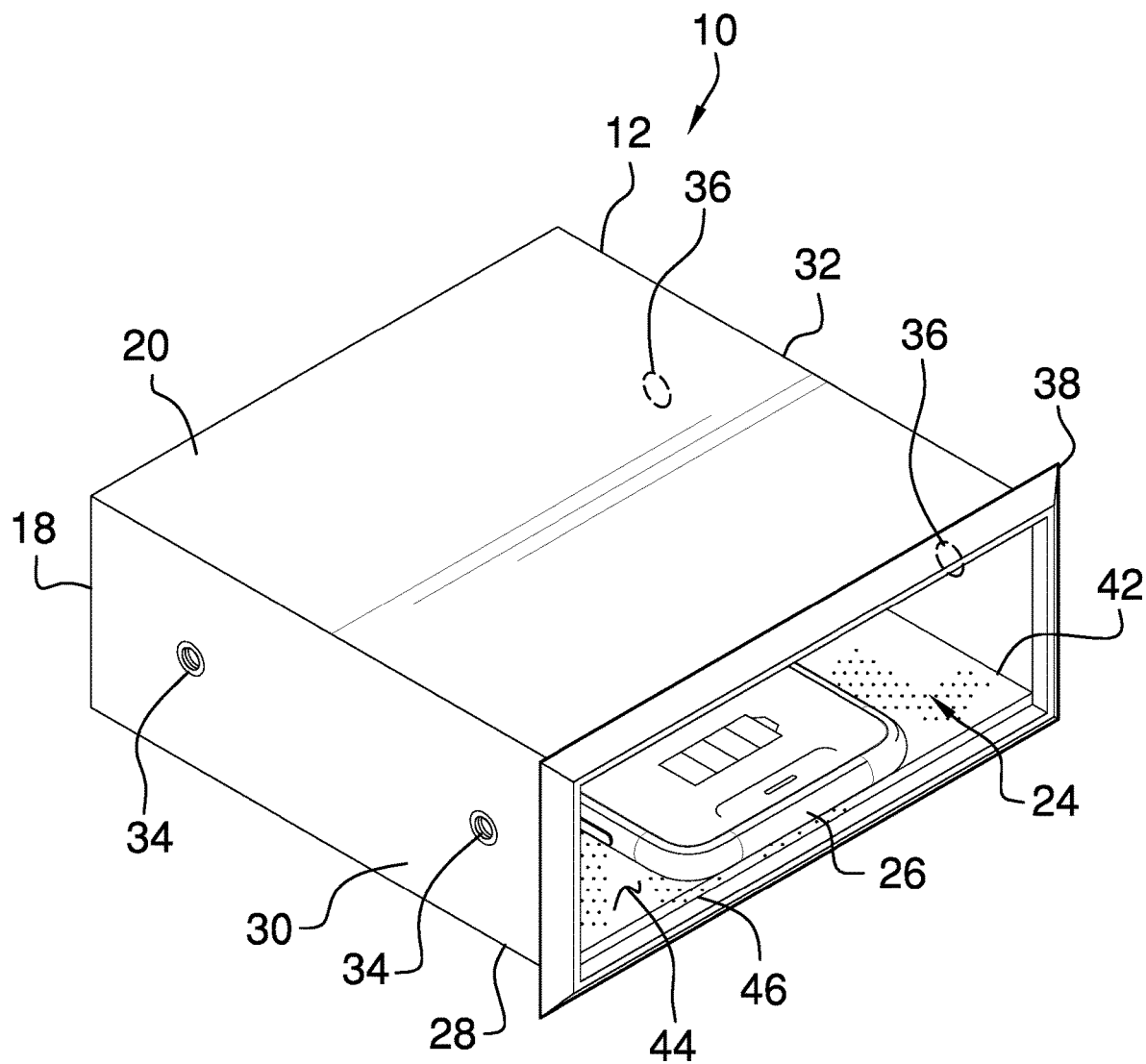
FIG. 1 is a front perspective view of a wireless vehicle charger assembly according to an embodiment of the disclosure.
Figure 2:
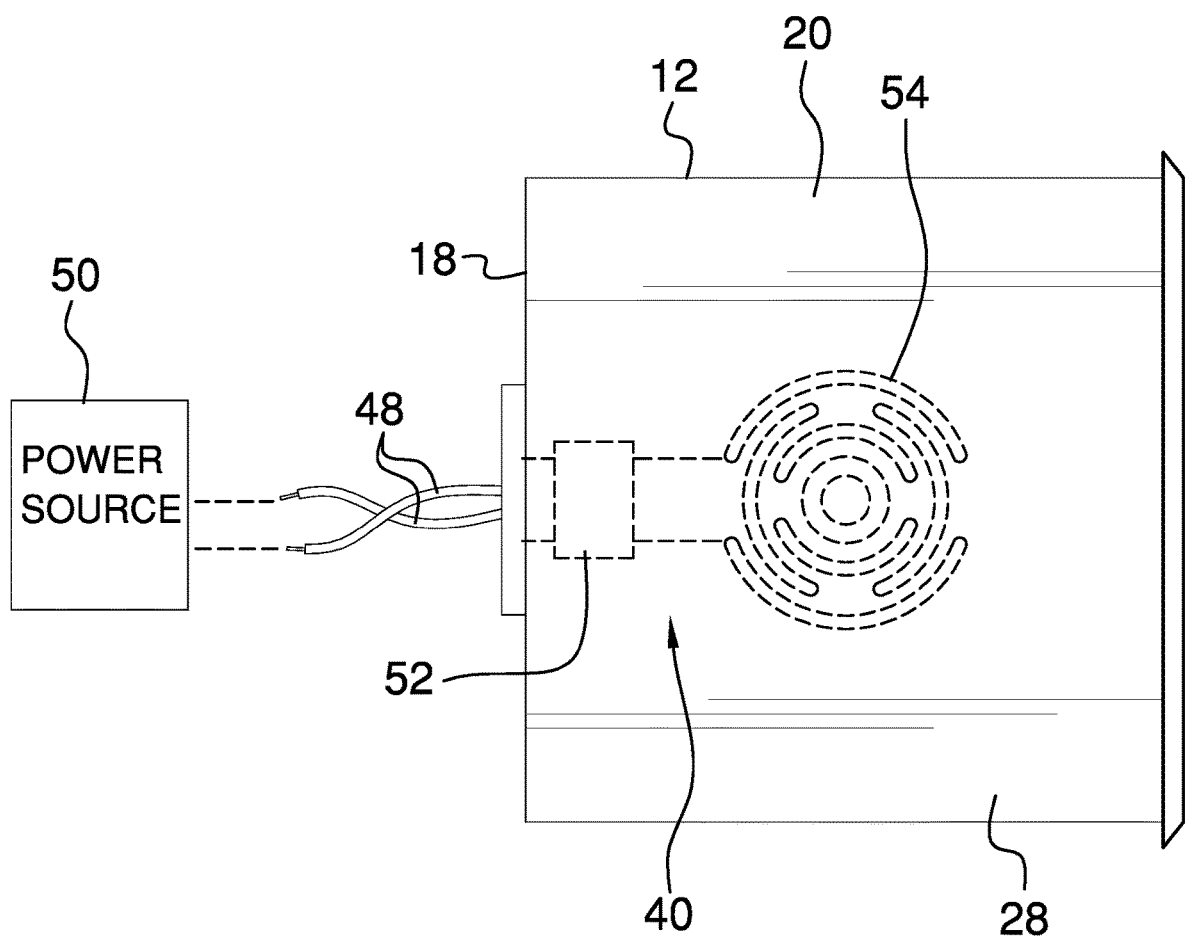
FIG. 2 is a bottom phantom view of an embodiment of the disclosure.
Figure 3:
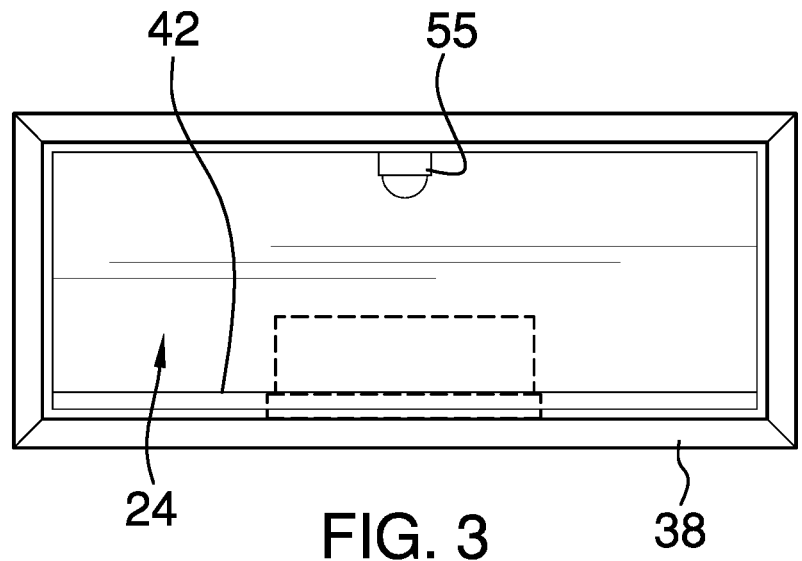
FIG. 3 is a front phantom view of an embodiment of the disclosure.
Figure 4:
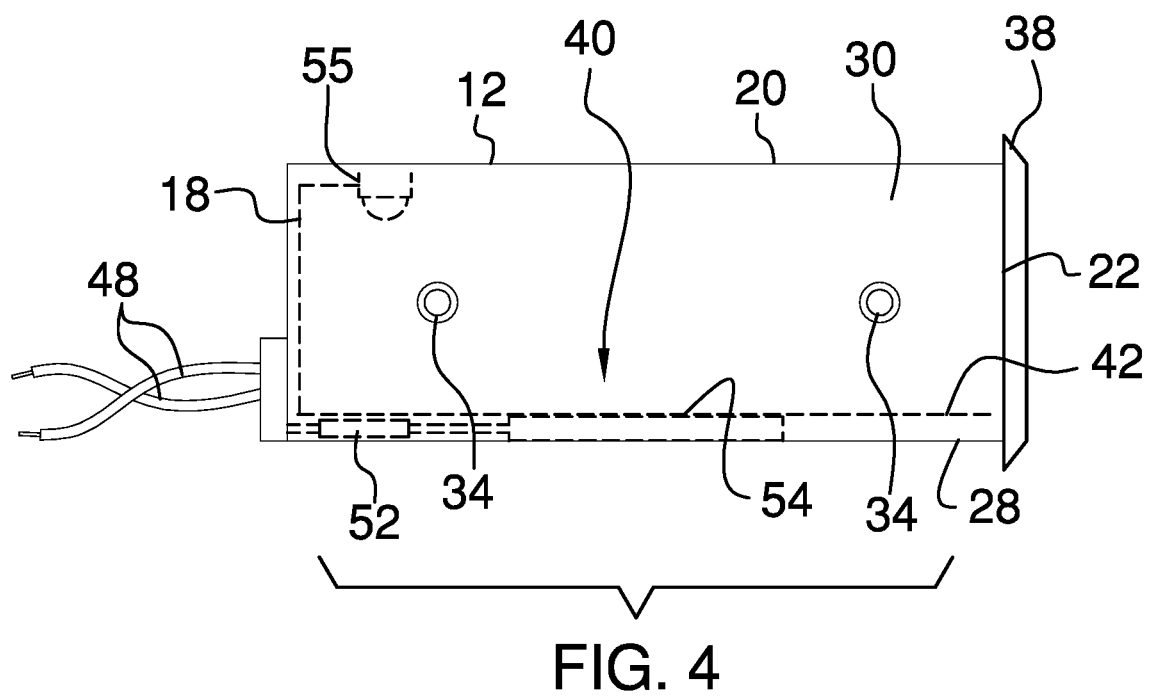
FIG. 4 is a right side phantom view of an embodiment of the disclosure.
Figure 5:
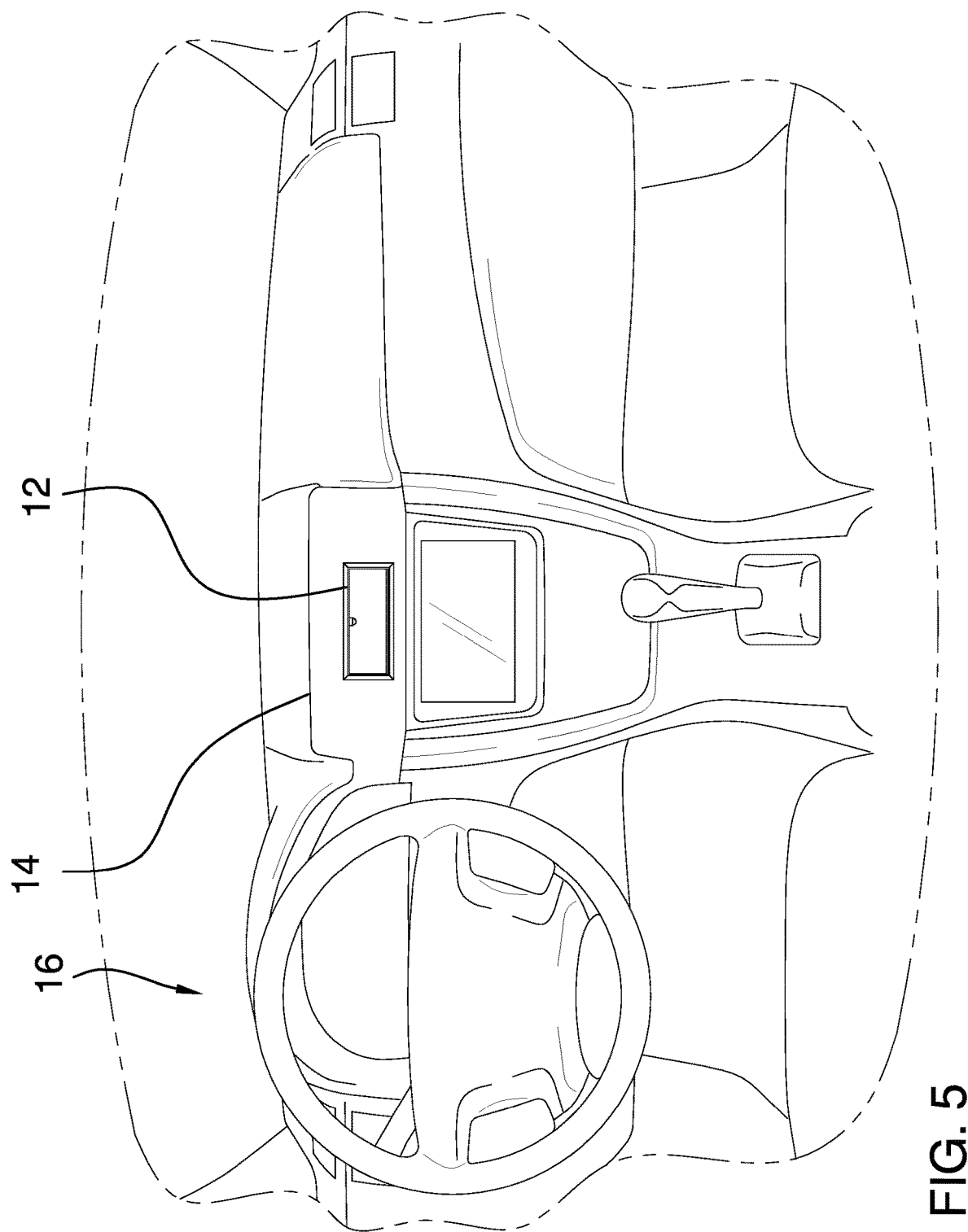
FIG. 5 is a perspective in-use view of an embodiment of the disclosure.

With reference now to the drawings, and in particular to FIGS. 1 through 6 thereof, a new charger device embodying the principles and concepts of an embodiment of the disclosure and generally designated by the reference numeral 10 will be described.

As best illustrated in FIGS. 1 through 6, the wireless vehicle charger assembly 10 generally comprises a box 12 that is integrated into a dashboard 14 of a vehicle 16 such that the box 12 is accessible to a driver of the vehicle 16. The vehicle 16 may be a passenger vehicle, a cargo vehicle or any other type of motorized vehicle. The box 12 has a rear wall 18 and an outer wall 20 extending forwardly therefrom. The outer wall 20 has a distal edge 22 with respect to the rear wall 18 defining an opening 24 into the box 12 to insertably receive an electronic device 26. The electronic device 26 may be a smart phone or other electronic device that can be wirelessly charged.

The outer wall 20 has a bottom side 28, a first lateral side 30 and a second lateral side 32. The first lateral side 30 has a pair of first engagement points 34 thereon. Each of the first engagement points 34 accommodates a fastener for retaining the box 12 in the dashboard 14. The second lateral side 32 has a pair of second engagement points 36 thereon. Each of the second engagement points 36 accommodates a fastener for retaining the box 12 in the dashboard 14. A bezel 38 is coupled to the outer wall 20 of the box 12 and the bezel 38 is aligned with the distal edge 22 of the outer wall 20. The bezel 38 extends around a full perimeter of the distal edge 22 to enhance the ornamental appearance of the box 12 in the dashboard 14.

A charging unit 40 is provided and the charging unit 40 is integrated into the box 12. The charging unit 40 is in wireless communication with the electronic device 26 when the electronic device 26 is positioned in the box 12. Additionally, the charging unit 40 broadcasts a charging signal to wirelessly charge the electronic device 26. The charging unit 40 comprises a plate 42 that has a top surface 44 and a bottom surface 46, and the plate 42 is positioned in the box 12 having the bottom surface 46 engaging the bottom side 28 of the outer wall 20 of the box 12.

The charging unit 40 includes a plurality of conductors 48 that is each coupled to and extends away from the rear wall 18 of the box 12. Additionally, each of the conductors 48 is electrically coupled to a power source 50 comprising an electrical system of the vehicle 16. The charging unit 40 includes a control circuit 52 that is integrated into the plate 42. The control circuit 52 is electrically coupled to the conductors 48. The charging unit 40 includes a transmitter 54 that is positioned between the top surface 44 and the bottom surface 46 of the plate 42. The transmitter 54 is electrically coupled to the control circuit 52 and the transmitter 54 broadcasts the charging signal through the plate 42. The transmitter 54 may comprise a radio frequency transmitter or the like which includes an induction coil for producing an electromagnetic field that can transfer electrical energy to a charging receiver in the electronic device 26.

Figure 6:
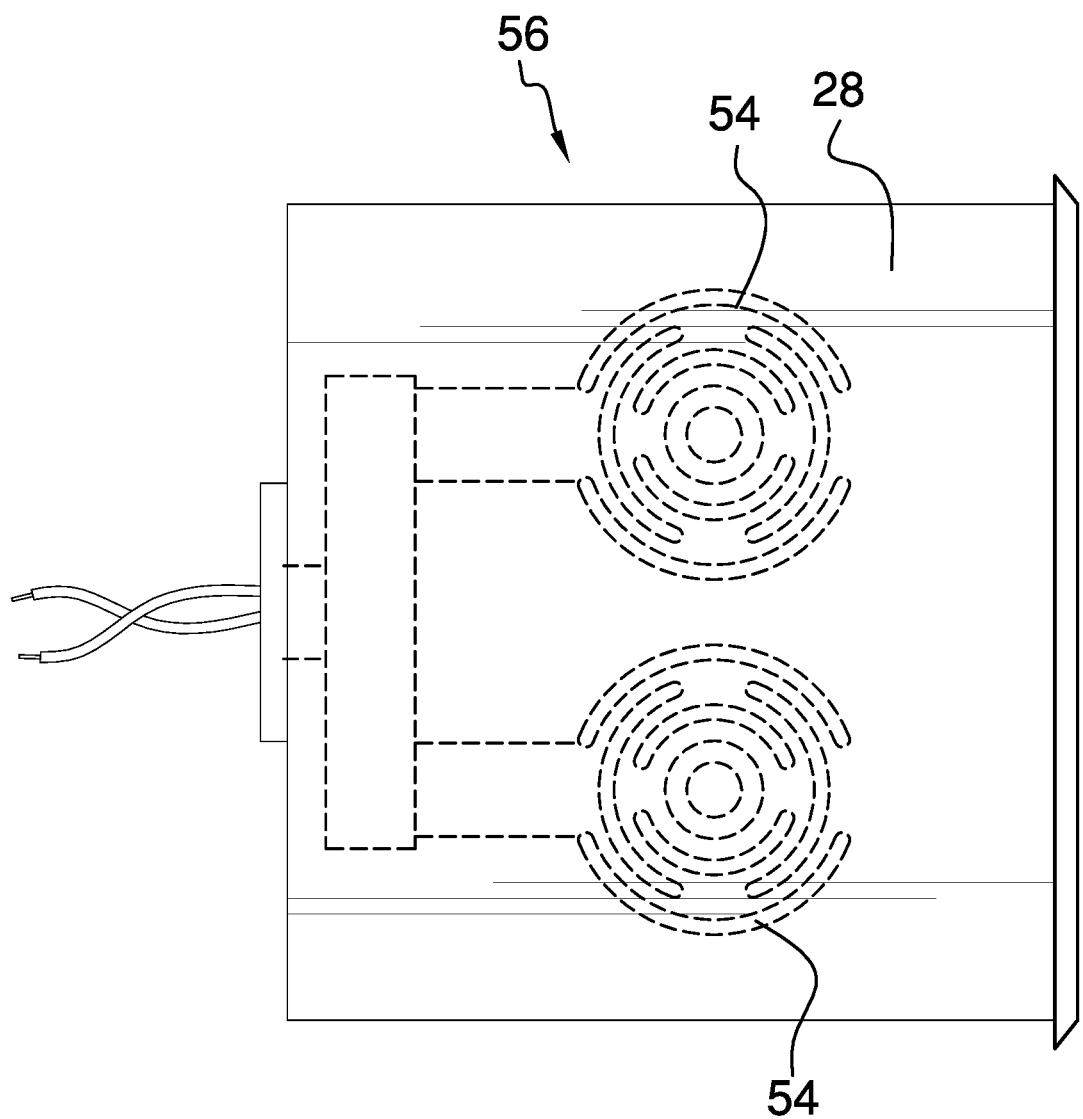
FIG. 6 is a bottom phantom view of an alternative embodiment of the disclosure.

The charging unit 40 includes a light emitter 55 that is positioned inside the box 12. The light emitter 55 is electrically coupled to the control circuit 52 and the light emitter 55 is turned on when the transmitter 54 is placed in communication with the electronic device 26. The light emitter 55 may comprise an LED or other similar electronic light emitter. In an alternative embodiment 56 as is shown in FIG. 6, a pair of the transmitters 54 may be provided for charging a pair of electronic devices 26.

In use, the electronic device 26 is positioned in the box 12 when the electronic device 26 needs to be charged. The electronic device 26 rests on the plate 42 thereby facilitating the electronic device 26 to be aligned with the transmitter 54 to wirelessly charge the electronic device 26. In this way the power ports or usb ports in the vehicle 16 do not need to be employed for charging the electronic device 26. Additionally, the box 12 facilitates the electronic device 26 to be stored in an out of the way location while the electronic device 26 is charging.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wireless vehicle charger assembly for wirelessly charging an electronic device in a vehicle, said assembly comprising:
   a box being integrated into a dashboard of a vehicle wherein said box is configured to be accessible to a driver of the vehicle;
   a charging unit being integrated into said box wherein said charging unit is configured to be in wireless communication with the electronic device when the electronic device is positioned in said box, said charging unit broadcasting a charging signal wherein said charging unit is configured to wirelessly charge the electronic device; and
   wherein said box has a rear wall and an outer wall extending forwardly therefrom, said outer wall having a distal edge with respect to said rear wall defining an opening into said box wherein said opening is configured to insertably receive an electronic device, said outer wall having a bottom side, a first lateral side and a second lateral side, said first lateral side having a pair of first engagement points thereon wherein each of said first engagement points is configured to accommodate a fastener for retaining said box in the dashboard, said second lateral side having a pair of second engagement points thereon wherein each of said second engagement points is configured to accommodate a fastener for retaining said box in the dashboard.

2. The assembly according to claim 1, further comprising a bezel being coupled to said outer wall of said box, said bezel being aligned with said distal edge of said outer wall, said bezel extending around a full perimeter of said distal edge wherein said bezel is configured to enhance the ornamental appearance of said box in the dashboard.

3. The assembly according to claim 1, wherein said charging unit comprises a plate having a top surface and a bottom surface, said plate being positioned in said box having said bottom surface engaging said bottom side of said outer wall of said box.

4. The assembly according to claim 1, wherein said charging unit includes a plurality of conductors, each of said conductors being coupled to and extending away from said rear wall of said box wherein each of said conductors is configured to be electrically coupled to a power source comprising an electrical system of the vehicle.

5. The assembly according to claim 3, wherein said charging unit includes a control circuit being integrated into said plate, said control circuit being electrically coupled to said conductors.

6. The assembly according to claim 5, wherein said charging unit includes a transmitter being positioned between said top surface and said bottom surface of said plate, said transmitter being electrically coupled to said control circuit, said transmitter broadcasting said charging signal through said plate.

7. A wireless vehicle charger assembly for wirelessly charging an electronic device in a vehicle, said assembly comprising:
   a box being integrated into a dashboard of a vehicle wherein said box is configured to be accessible to a driver of the vehicle, said box having a rear wall and an outer wall extending forwardly therefrom, said outer wall having a distal edge with respect to said rear wall defining an opening into said box wherein said opening is configured to insertably receive an electronic device, said outer wall having a bottom side, a first lateral side and a second lateral side, said first lateral side having a pair of first engagement points thereon wherein each of said first engagement points is configured to accommodate a fastener for retaining said box in the dashboard, said second lateral side having a pair of second engagement points thereon Wherein each of said second engagement points is configured to accommodate a fastener for retaining said box in the dashboard;

a bezel being coupled to said outer wall of said box, said bezel being aligned with said distal edge of said outer wall, said bezel extending around a full perimeter of said distal edge wherein said bezel is configured to enhance the ornamental appearance of said box in the dashboard; and a charging unit being integrated into said box wherein said charging unit is configured to be in wireless communication with the electronic device When the electronic device is positioned in said box, said charging unit broadcasting a charging signal wherein said charging unit is configured to wirelessly charge the electronic device, said charging unit comprising:

a plate having a top surface and a bottom surface, said plate being positioned in said box having said bottom surface engaging said bottom side of said outer wall of said box;

a plurality of conductors, each of said conductors being coupled to and extending away from said rear wall of said box wherein each of said conductors is configured to be electrically coupled to a power source comprising an electrical system of the vehicle;

a control circuit being integrated into said plate, said control circuit being electrically coupled to said conductors; and a transmitter being positioned between said top surface and said bottom surface of said plate, said transmitter being electrically coupled to said control circuit, said transmitter broadcasting said charging signal through said plate.

8. A wireless vehicle charger system for wirelessly charging an electronic device in a vehicle, said system comprising:

a vehicle having a dashboard;

a box being integrated into said dashboard of said vehicle wherein said box is configured to be accessible to a driver of said vehicle, said box having a rear wall and an outer wall extending forwardly therefrom, said outer wall having a distal edge with respect to said rear wall defining an opening into said box wherein said opening is configured to insertably receive an electronic device, said outer wall having a bottom side, a first lateral side and a second lateral side, said first lateral side having a pair of first engagement points thereon wherein each of said first engagement points is configured to accommodate a fastener for retaining said box in said dashboard, said second lateral side having a pair of second engagement points thereon Wherein each of said second engagement points is configured to accommodate a fastener for retaining said box in said dashboard;

a bezel being coupled to said outer wall of said box, said bezel being aligned with said distal edge of said outer wall, said bezel extending around a full perimeter of said distal edge wherein said bezel is configured to enhance the ornamental appearance of said box in said dashboard; and a charging unit being integrated into said box wherein said charging unit is configured to be in wireless communication with the electronic device when the electronic device is positioned in said box, said charging unit broadcasting a charging signal wherein said charging unit is configured to wirelessly charge the electronic device, said charging unit comprising:

a plate having a top surface and a bottom surface, said plate being positioned in said box having said bottom surface engaging said bottom side of said outer wall of said box;

a plurality of conductors, each of said conductors being coupled to and extending away from said rear wall of said box wherein each of said conductors is configured to be electrically coupled to a power source comprising an electrical system of the vehicle;

a control circuit being integrated into said plate, said control circuit being electrically coupled to said conductors; and a transmitter being positioned between said top surface and said bottom surface of said plate, said transmitter being electrically coupled to said control circuit, said transmitter broadcasting said charging signal through said plate.

\* \* \* \* \*